Patented Feb. 8, 1949

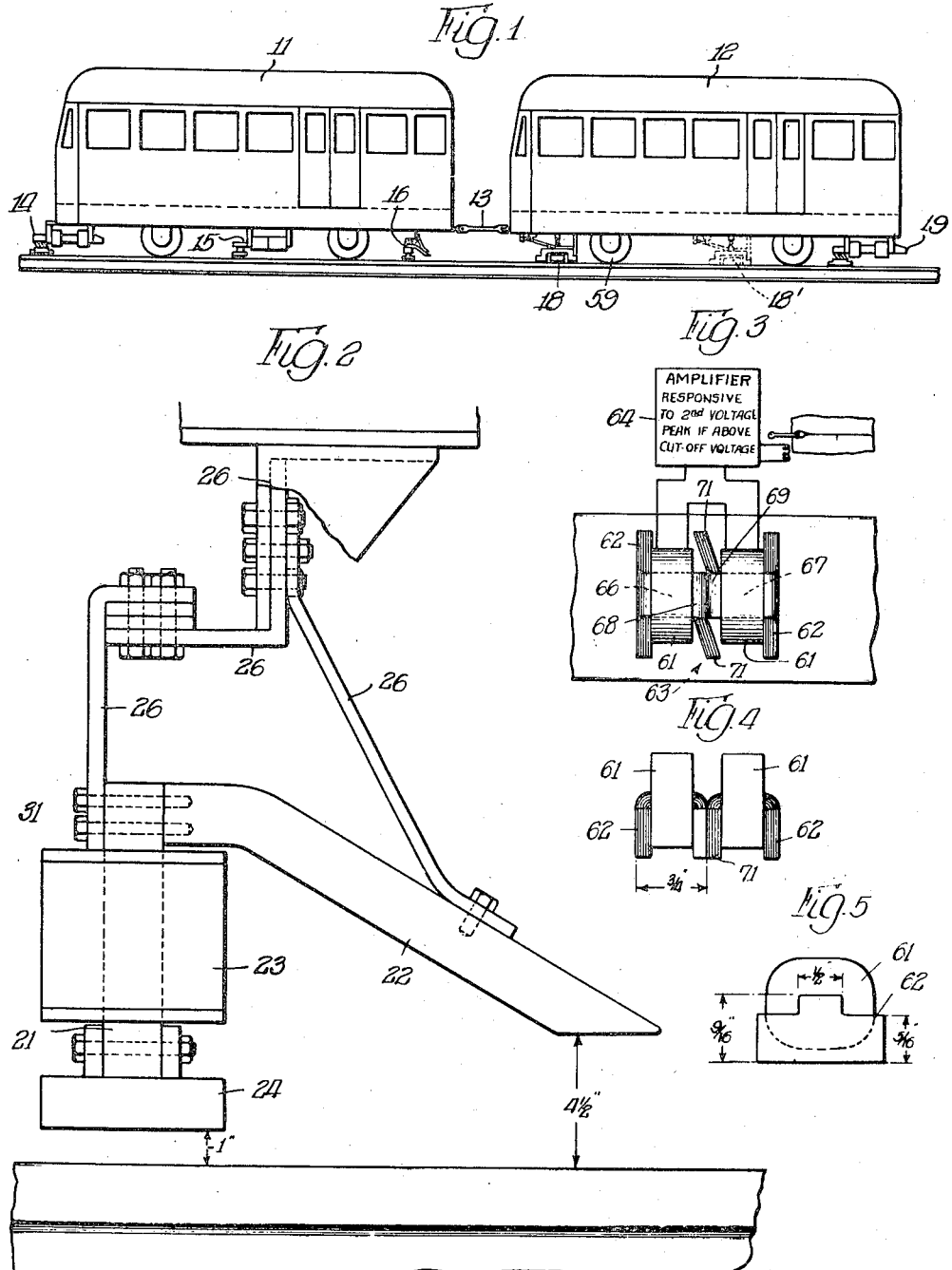

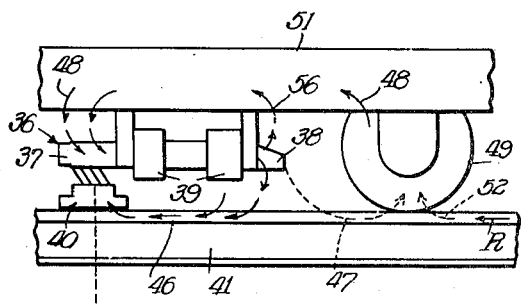
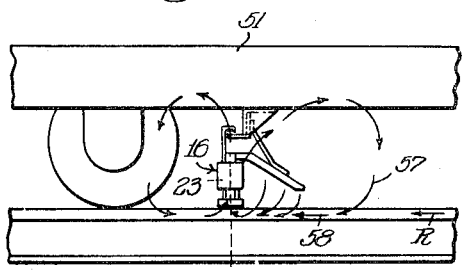
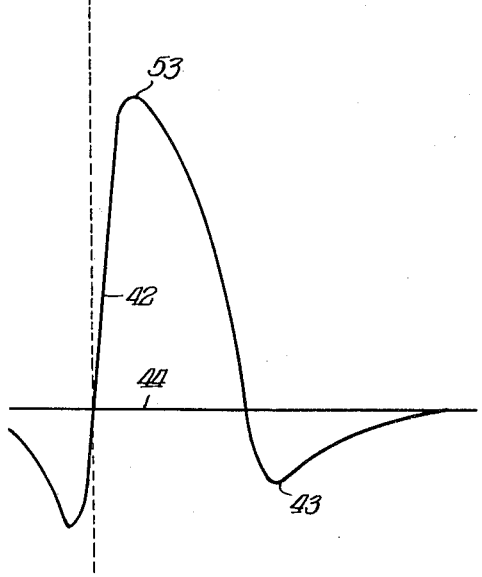
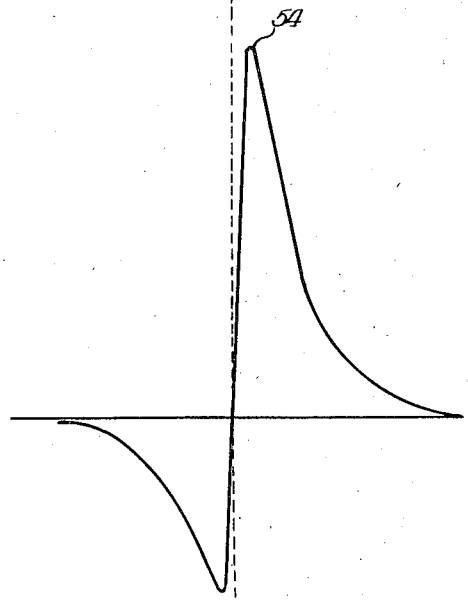

2,461,253

UNITED STATES PATENT OFFICE 2,461,253

FLAW DETECTION APPARATUS

Walter C. Barnes, Lake Bluff, and Henry W. Keevil, Evanston, Ill.

Application June 5, 1944, Serial No. 538,819

12 Claims. (Cl. 175—183)

In testing the rails of railroad tracks, to detect hidden fissures, it is important to be able to distinguish fissures from surface defects such as wheel burns. Unless the detecting apparatus is selectively responsive to fissures, it cannot be made highly sensitive to detect very small fissures, without also being actuated by such non-fissure irregularities as burns, for example. In the past, this has constituted one of the chief obstacles in the detection of smaller fissures.

In spite of vast strides which have been made in this field heretofore, the present invention is believed to be an outstanding improvement both in the differentiation between fissurs and non-fissure irregularities, such as burns, and in the smallness of fissures which can be reliably detected.

According to the present invention, it has been found that a certain combination of magnetizing magnet and pickup coils is exceptionally effective in distinguishing fissures from other irregularities. The magnetizing magnet apparently establishes a field in the vicinity of the fissure which is exceptionally suitable for actuating the particular pickup unit whereas the same magnet will not ordinarily establish adjacent to non-fissure irregularities the type of field to which the particular pickup unit is responsive.

Both the magnet and the pickup unit are novel an deach has some advantage over its predecessors even when not used in conjunction with the other, particularly in the residual magnetic testing system.

The magnetizing magnet which may be the last of a series of such magnets brings the longitudinal flux in the rail up to a desired value and, as it passes beyond a particular spot of the rail, avoids any tendency toward reversing the flux which would decrease the flux below its ultimate residual value and also avoids any high concentration of vertical flux which might cause the undesired detection of non-fissure irregularities. This is accomplished by providing a vertical energizing coil on a vertically disposed core portion having a leg extending rearwardly from above the coil and approaching the rail more closely toward its trailing end. It appears to be important to avoid excessive concentrations of vertical flux entering the rail, especially by the rear pole. To this end it now seems to be best to have the front pole fairly large and spaced about an inch from the rail while the closest portion of the rear pole is spaced considerably further from the rail.

This magnet is also considerably more efficient than prior rail magnetizing magnets. Two factors contributing to this are the reduction in idle leakage flux and the elimination of any reduction of flux behind the magnet to values lower than the final residual value. The increased efficiency permits the use of a smaller size.

The preferred pickup unit comprises a pair of coils positioned in tandem and connected in series opposition with their cores overlapping one another longitudinally where they do not abut against one another. The overlap may be accomplished for example, by shaping a portion of the rear pole of the front magnet to extend rearwardly and a portion of the front pole of the rear magnet to extend forwardly, or by providing a double core structure which will efficiently use a single intermediate pole for both coils. The core length is quite short. It appears that the short core length makes the coils extremely unresponsive to the types of magnetic fields set up adjacent burns by the magnetizing magnet, especially that disclosed herein; and that the overlapping effect at the intermediate pole position causes the voltage peaks induced in the two coils to coincide more closely than has heretofore been possible so as to get a higher combined peak. The greatest advantage of this pickup unit is obtained by the use of an amplifying circuit selectively responsive to voltages above a predetermined floor level even though the voltage pak may be of very short duration. Such a circuit is disclosed in our copending application Serial No. 482,526, now abandoned, the disclosure of which is hereby incorporated in the present application by reference. The present pickup unit is an improvement on the pickup unit there disclosed and may have some utility in a wide variety of systems.

It has been discovered that there is some advantage in mounting the final magnetizing magnet, especially if it is of the preferred type, behind the last wheel preceding the pickup unit so that the flux left by it will not be disturbed by the wheel, which sometimes produces or increases magnetic irregularities.

Additional objects and advantages of the invention will be apparent from the following description and from the drawings, in which Fig. 1 is a diagrammatic view of a form of invention chosen for illustration;

Fig. 2 is a side elevational view of the preferred form of magnet chosen for illustration showing its relationship to the rail;

Fig. 3 is a plan view of a preferred form of pickup unit;

Fig. 4 is a side elevation thereof;

Fig. 5 is an end elevation thereof;

Fig. 6 is a chart showing in the upper half thereof one form of magnet and the direction of flux which the magnet tends to produce and in the lower half thereof, a curve correlated to the upper half of the figure and showing the approximate apparent flux density in the various parts of the rail; and Fig. 7 is a similar chart with respect to the preferred form of magnet.

A preferred form of the invention has been chosen for illustration and description in compliance with Section 4888 of the Revised Statutes, but persons skilled in the art will readily perceive other means for accomplishing the same results, and the claims are, therefore, to be construed as broadly as possible, consistent with the prior art.

The invention is especially intended for use in connection with the detection of flaws in rail in track by the residual magnetic system of testing. Equipment of which the present invention may form a part is illustrated diagrammatically in Fig. 1. In this view, the test car comprises two sections 11 and 12 connected by a coupler 13. The front section 11 carries three magnetizing magnets 14, 15 and 16. The rear section 12 carries a detector 18 and a demagnetizer 19. The electromagnets 14, 15 and 19 need not be changed from prior practice in the practice of this invention. Magnets 14 and 15 are sufficiently described in our prior Patent No. 2,317,720. The present invention is especially concerned with magnet 16 and with the combination thereof with pickup unit 18, and preferably with the magnets 14 and 15 preceding magnet 16.

The magnet 16 includes a core having a front vertical leg 21 and a rear trailing leg 22. A coil 23 surrounds the front leg 21. The front leg is provided with an enlarged pole piece 24.

The magnet unit 16 is supported from the frame of car 11 by support brackets 26. At present, it is preferred that these brackets be non-magnetic, non-magnetic stainless steel have been found satisfactory for this purpose. The trailing core member 22 may be secured to the front core member 21 by screws 31 which also secure one of the brackets 26 to the magnet.

It will be observed that this is a rigid mounting. Means for raising the magnet or part thereof may be provided if desired, but at present, the preferred position of the magnet is far enough above the rail so that a rigid mounting is practicable. Rigidity is desired from the standpoint of simplicity and rigidity within the magnet itself is desirable from the standpoint of magnetic efficiency.

Some of the advantages of the magnet shown in Fig. 2 over prior magnets, such as that of Fig. 6, can best be described by reference to Figs. 6 and 7. In Fig. 6, the magnet 36 is presented as provided with an L-type core having a front portion 37 and a main core or leg 38 on which coils 39 are mounted. The core portion 38 is horizontal.

Front portion 37 carries pole 40, the lower portion of which may be a non-magnetic shoe.

The apparent flux in various parts of the rail 41 have been plotted in the lower half of Fig. 6. The measurements were made by winding a test coil around the rail 41 at one point thereof energizing the coils 39 with normal current and then interrupting this current while reading a galvanometer connected to the test coil. By using this ballistic method and with the test coil in relatively different positions along the rail 41, a series of values were obtained which could be used to plot the curve 42. From a description of the test, it will be apparent that the curve does not necessarily plot the actual flux in the rail 41 but rather that it plots the flux change upon interruption of the energizing current. For convenience, this may be called the apparent flux. It is different from the real flux because of the fact that it does not take into consideration the residual flux which remains even after the energizing coils are de-energized. Although a curve plotted in this way cannot be relied on for absolute values, it is adequate for the purpose of illustration and comparison.

Attention is directed particularly to the dip 43 in curve 42. It will be observed that this dip has a negative value with reference to the zero line 44. Although the presence of residual flux keeps this zero line from truly representing zero flux, the fact remains that there is less flux of a positive or forward direction in the corresponding point of the rail while the core is energized than after it is de-energized. If we assume that the positive flux extends forwardly of the rail as indicated, for example, by the arrows 46, then it would seem that in the vicinity represented by the dip 43, there must be some negative or reverse flux indicated by the dotted line arrows 47. There could be such flux as a result of following the path indicated by the arrows 48 through the wheel 49 and the steel frame 51 thus completing a flux circuit from trailing core 38 to forward core 37. As a matter of convenience, this phenomenon may be referred to as reverse flux, even though in fact, it may merely represent a diversion of some of the residual flux "R" so that it is diverted from the wheel and the frame as indicated by arrows 52. That the phenomenon which we call reverse flux is not actually reverse flux in this instance seems to be indicated by the fact that when the magnet and wheel have passed beyond a given point, that point is residually magnetized with a forward or positive flux. Nevertheless, this forward or positive flux is evidently less strong after having been subjected to the phenomenon represented by dip 43 than if there had been no such phenomenon.

In Fig. 7, we see that this phenomenon is not produced by the preferred magnet 16 of the present invention. This is apparently due to the fact that to the extent that the car frame member 51 is magnetized, it is magnetized with the polarity of the trailing pole 22 rather than the forward pole 24. The trailing core portion 22 is much closer to the frame member 51 than the front pole 24. In other words, it appears that by disposing the coil 23 in a position with its axis vertical and energizing it with current of a polarity to give its upper end the polarity of a trailing pole, the trailing reversed flux phenomenon represented by dip 43 is avoided.

The avoidance of this trailing reverse flux phenomenon is an important feature of the present invention, since this phenomenon necessarily resulted in a partial de-magnetization or knockdown of the rail following the magnetization thereof indicated by the crest of the curve in Fig. 6. In other words, even if the crest 54 in Fig. 7 were no higher than the crest 53 in Fig. 6, the resultant residual magnetism in the rail would be considerably higher in Fig. 7 than in Fig. 6 because it had not been partially knocked down by the dip 43.

As a matter of fact, however, it will be observed that the peak 54 is higher than the peak 53. This is in spite of the fact that fewer ampere turns are used on the magnet 16 than on the magnet 36. This increased efficiency may be due to a variety of contributing factors. The remoteness of forward pole 24 from structural member 51 tends to decrease the amount of flux which in Fig. 6 was uselessly short-circuited through the frame 51, as indicated by arrows 56 and 48. In magnet 36, it has been found undesirable to have the trailing pole 38 approach the rail because it increased the dip 43. With magnet 16, however, it is practicable for the trailing core or pole member 22 to approach the rail, with a fairly large area of unwound core structure as close to the rail as illustrated in Fig. 2. The flux path from pole member 22 through the rail to pole member 24 becomes of relatively low reluctance so that flux of high intensity can be made to take this path with relatively few ampere turns in the coil 23. In addition, all of the leakage flux from frame member 51 to the rail rearwardly of magnet 16 is added to the positive magnetizing flux as indicated by arrows 57 and 58.

To the extent that the dip 43 represents a divergence of the residual flux "R," it may be desirable to have the positive field of the magnet 16 taper off quite gradually. This is accomplished by the leakage flux indicated by arrows 57 between the frame member 51 and the rail.

It is important that the detecting unit 18 be positioned outside of the field of the magnet 16 so that it is responsive only to residual magnetism of the rail. In the past, this has been accomplished by either spacing the magnet 16 a considerable distance from the detecting unit 18 or by so positioning them that a wheel 49 came between them. It has been determined, however, that a wheel between the final magnet and the detecting unit has some disadvantage in increasing a tendency toward false indications. There may be several contributing factors in this. The occasional striking of the flange of the wheel against the gauge edge of the rail may disturb the magnetic field at that point. Any slight roughening of the rail surface at the point of a burn, for example, might cause the wheel to deliver some hammer blows to the rail which would have a disturbing effect on its magnetic characteristics. It is even possible that the smooth flexing of the rail by the weight of the car exerted through the wheel affects the magnetic state of the rail in which case it might affect it differently where there is a burn or a gag mark than elsewhere. In any event, it is apparent that these various causes of false indication can be eliminated by so positioning the magnet and the detecting unit that there is no wheel between them. Heretofore, the detecting unit has been positioned in the dotted line position 18'.

The presence of an intervening wheel could be avoided by placing the magnet 16 just to the rear of the wheel 59 shown in Fig. 1, in which case the detector would be in the position indicated at 18'.

Another important advantage flowing from the preferred form of magnet illustrated in Fig. 2 is that there is more difference than heretofore between the characteristic fields left in the vicinity of the fissures than those left in the vicinity of other irregularities. Apparently this is due to avoiding any high concentration of vertical flux leaving or entering the rail to the rear of the main magnetizing field represented by peak 54. The trailing core portion 22 is preferably shaped so as to provide a fairly large area of uniform flux between it and the rail at least under the latter half of the portion 22. In this way, a high total value of flux may be obtained without having it excessive at any one point to the rear of the peak 54. The vertical flux would be excessive if it produces a strong enough residual vertical field to give too many false indications, or if it so overbalanced the longitudinal magnetic forces as to cause the longitudinal flux at any point to drop below the final residual value. It may also be desirable that extremely high values of flux between front pole 24 and the rail be avoided and this is accomplished by providing a pole 24 of fairly large area (about 5 by 6 inches) on its bottom face and spacing it substantially from the rail, about one inch being at present preferred.

It is, of course, necessary to use a pickup which is selectively responsive to the different characteristic fields and the more highly selective it is, the more sensitive it can be made for detecting very small fissures without responding too often to non-fissure irregularities. It should be understood that when the detector responds to non-fissure irregularities, it is necessary for the crew either to use judgment in ignoring it with considerable danger of overlooking fissures or to stop and make a hand test with considerable delay in the progress of the tests.

The preferred form of pickup for use with the illustrated form of magnetizing magnet is shown in Figs. 3 to 5. In these figures, the pickup includes a pair of coils 61 which are preferably connected in series opposition and are wound on a core structure, as shown in Fig. 3, between end pole portions 62 and intermediate pole portions 63. The coils are preferably connected to an amplifying and recording apparatus, the amplifier preferably being of the type disclosed in our application, Ser. No. 482,526, especially Fig. 7 thereof.

A characteristic of this amplifier is that it shuts off all impulses below a predetermined voltage level and is highly sensitive to even very brief voltage peaks above said level. Also it is selective to a given polarity and it is important that it be connected with such polarity that it will be responsive to the second peak voltage. In other words, as the forward pole 62 passes over the fissure, the voltage induced at this time will not actuate the amplifier and recorder 64 no matter how high the voltage is, whereas the voltage induced when the pole portion 63 passes over the fissure will be of such polarity as to actuate the amplifier and recorder 64 if of sufficiently high voltage. The reason it is important to connect the amplifier to the coils with such polarity as to be responsive to the second peak is that this peak is much higher than the other peaks when traversing a fissure.

The illustrated form of pickup has been found to be exceptionally effective in being selectively responsive to fields characteristic of fissures in a rail which has been energized with the magnet of Fig. 2. In the illustrated form, the core structure includes two separate cores 66 and 67. The core 66 includes one of the end poles 62 and a pole part 68. The core 67 includes the other end pole 62 and a pole part 69. Each of the pole parts 68 and 69 could be referred to as a pole, but inasmuch as they are in close magnetic contact with one another, they function somewhat as a single pole.

In our application, Ser. No. 482,526, the two intermediate poles were in contact with one another to bring the cores into end to end relationship but were shaped the same as the end poles. It was pointed out in said application, however, that the voltage peaks probably occurred when the respective poles traversed the fissure and that in order to coincide these peaks perfectly, it was probably theoretically desirable to have the poles coincide. Specifically, it was stated that "In the case of two coils, this would mean that for perfect coinciding of the peaks, the first pole of the second coil should coincide in longitudinal position with the second pole of the first coil. Longitudinal coincidence is approximated by having the cores in contact end to end."

According to the present invention, longitudinal coincidence is even more closely approximated or actually attained and the results are surprising even as compared with the highly efficient pickup of Serial No. 482,526. The more exact longitudinal coincidence is obtained as seen best in Fig. 3, in which pole parts 68 and 69 are each provided with legs 71 which slant in the direction toward the other core so that the two are coextensive longitudinally of the rail and longitudinally of the pickup unit.

Our prior application, Ser. No. 482,526 also pointed out that in the pickup there disclosed, the central combined pole, including a pole of each core, has twice the cross section or thickness of the end poles, but stated that under some circumstances, it may be desirable to reduce the thickness at least to the thickness of the end poles. It will be observed that the Fig. 3 structure approaches this result in that the legs 71 are each of the thickness of the end poles 62, or, in a longitudinal direction, have very slightly greater thickness.

The pickup unit above described is highly responsive to the fields which the magnet of Fig. 2 leaves adjacent the vicinity of fissures and is relatively unresponsive to fields which this same magnet leaves adjacent non-fissure irregularities such as burns. For this reason, it is possible to adjust the amplifier and recorder 64 with a very high sensitivity so as to detect very small fissures without detecting enough non-fissure irregularities to unduly retard the progress of the tests.

Although wide departures may be made from the exact dimensions which have been found satisfactory, it may be helful to give these dimensions by way of example. The cross section of the core members 21 and 22 is two inches by three inches, the longer dimension extending transversely of the rail. The leg 22 extends rearwardly sixteen inches, its actual length being somewhat greater than this. The slope of the sloping portion thereof is 30° above horizontal. The pole 24 is six inches longitudinally of the rail by five inches transversely of the rail. The coil 23 may be retained at its ends by fibre mats adjacent thereto, backed up by one-eighth inch brass plates. This coil has 2926 turns of No. 16 enamel single cotton-covered wire and an energizing current of 2.8 amperes has been found satisfactory. The height of the coil is 7⅜ inches.

Most of the dimensions of a preferred pickup unit are shown in the drawings. In addition, it is noted that each core is made up of 12 laminations of .014 inch thickness. Each coil 61 includes ten thousand turns of No. 42 enameled wire, this wire being .0025 inch in diameter.

Of course a variety of pickup units can be used, though some of them would lack some of the advantages of the present invention. Some departures from the illustrated dimensions will not be very harmful. For example, a pair of H-shaped coils each one inch long overall is much better than the longer coils previously used, even though not as desirable as the slightly shorter size shown. An integral core structure for both coils could be used.

Although the trailing leg 22 of magnet 16 has been shown bare or unwound, it is possible that an auxiliary winding may be desirable on it as for example to distribute the flux pattern in a predetermined way. It would nevertheless be regarded as substantially unwound by comparison with the main winding. Likewise, although its width is at present uniform and its thickness uniform except as seen in Fig. 2, it may be desirable to change its thickness for flux distribution effects in which case it may also be found desirable to extend it considerably further rearwardly and closer to the rail for the purpose of increasing its magnetic efficiency and more narrowly confining the field of magnet 16.

From the foregoing, it is seen that a system of detection has been devised which is highly selective in distinguishing fissures from non-fissure irregularities, thereby making it possible to detect much smaller fissures than it was possible to detect heretofore without obscuring the record and delaying the progress of the tests by indicating a number of other irregularities such as wheel burns in the same manner as fissures are indicated. Likewise with a setting of the present invention with slightly less than the extreme sensitivity, the testing may proceed with extremely few false indications. It is even possible for example to test for fissures within the joint bars and close to the end of the rails.

Attention is directed to the fact that certain novel features of the pickup unit per se, and the amplifier preferably used therewith are being claimed in copending applications.

We claim:

1. Apparatus for progressively detecting flaws in rail comprising a steel frame car adapted to run on the rail, and means on the car for creating residual magnetism in the rail in advance of an inductive detector unit, said means comprising an electro-magnet carried by the car adjacent the rail including a core having forward and rear poles and a coil on said core polarizing said core, the portion of said core having the polarity of the rear pole being substantially closer to the steel frame of said car than the portion of the core having the opposite polarity, said rear pole being further from the rail than the forward pole.

2. Flaw detection apparatus for progressively testing rail in track in a forward direction by the detection of characteristic residual magnetic conditions in the vicinity of fissures including a car adapted to run on said track and having a longitudinal steel structural member and a rail magnetizing magnet carried by said car adjacent one of the rails of the track on which it runs, said magnet including a core having forward and rear poles, spaced unequal distances from the rail, and a coil for magnetizing the core and the rail, the portion of the core projecting from the coil toward the rear pole being substantially closer to said steel structural member than the portion of the core projecting from the coil toward the forward pole.

3. A magnet for setting up residual magnetism in rail for the progressive detection of fissures therein in a forward direction including a core having an upwardly extending leg and a leg extending rearwardly and downwardly from the upper end thereof, a coil surrounding the upwardly extending leg; the rearward leg being substantially unwound and said upwardly extending leg having an enlarged pole piece thereon spaced from the rail a distance less than the minimum distance between the rail and any portion of the rearwardly extending leg, and nonmagnetic metal means for attaching the magnet to a car movable in one direction along said rail.

4. A magnet on a car for inducing residual magnetism in an adjacent rail in advance of an inductive detector comprising a core having an upwardly extending leg and a leg extending rearwardly and downwardly from the upper end thereof, and a coil surrounding the upwardly extending leg; the rearward leg being substantially unwound and said upwardly extending leg having an enlarged pole piece thereon spaced from the rail but extending closer to it than does the pole of the rearwardly extending leg.

5. Apparatus for detecting flaws progressively in ferro-magnetic bodies including magnetizing means mounted on a metal frame for movement along the body being tested comprising an electromagnet having a core with a generally vertical leg and a second leg extending rearwardly from the upper portion thereof, a coil on the generally vertical leg, said leg having an enlarged pole piece spaced from the body and said rearwardly extending leg being substantially unwound, approaching the rail rearwardly but being substantially spaced therefrom at all points, and a detecting unit including a pickup following the magnetizing means at a distance sufficient to be substantially outside of the field thereof to be responsive to the residual magnetism in the rail, said unit including core means having three poles longitudinally spaced along the rail and surrounded by coil means between the first and second and second and third poles, the spacing between successive poles being at least as short as approximately one inch and the intermediate pole having portions extending from the core metal common with each of the end poles to substantially the same extreme longitudinal positions, said detecting unit preceding any substantially complete magnetic flux path including any metal members other than the core.

6. In apparatus for magnetizing a rail for testing by the residual magnetic method, the combination of magnetizing means for setting up characteristic residual magnetic conditions in the vicinity of fissures in the rail, and a cleaner magnet for suppressing residual fields set up by the magnetizing means due to surface defects, said cleaner magnet including a core having a forward upwardly extending leg and a leg extending rearwardly and downwardly from the upper end thereof, a coil surrounding the forward leg, and means for energizing the coil with direct current, the rearward leg being so shaped and disposed that the longitudinal flux in the rail rearwardly of the forward leg all has the same polarity when tested ballistically.

7. In apparatus for magnetizing a rail for testing by the residual magnetic method, the combination of magnetizing means for setting up characteristic residual magnetic conditions in the vicinity of fissures in the rail, and a cleaner magnet for suppressing residual fields set up by the magnetizing means due to surface defects, said cleaner magnet including a core having an upwardly extending leg and a leg extending rearwardly and downwardly from the upper end thereof, said rearwardly extending leg being spaced from the rail a substantially greater distance than the upwardly extending leg, and a coil around the upwardly extending leg.

8. A magnet on a rail flaw detector car for inducing residual magnetism in a rail in advance of an inductive detector, said magnet comprising a core having an upwardly extending leg and a substantially unwound leg extending rearwardly and downwardly from the upper end thereof, and a coil around the upwardly extending leg, said upwardly extending leg having an enlarged pole piece thereon disposed closer to the rail than any portion of the rearwardly extending leg.

9. The method of detecting fissures in rail which includes the steps of subjecting the rail to a unidirectional longitudinal flux rearwardly from a magnet mounted on a steel frame car adapted to be drawn along said rail in one direction, and progressively testing the rail rearwardly of the magnetizing field with exploring means selectively responsive to the particular type of residual field which said unidirectional longitudinal flux leaves in the vicinity of fissures before subjecting the rail to the influence of a substantially continuous metallic flux path from the rail to the frame.

10. Apparatus for progressively detecting fissures in a rail comprising a metal frame, spaced metal wheels supporting the frame for movement along the rail in one direction, a magnet between the wheels comprising a core having a forward pole disposed closer to the rail than the rear pole, a coil around the core, means for energizing the coil with direct current, and a detector unit between the wheels spaced rearwardly from the trailing leg of the magnet and substantially outside the field thereof for detecting variations in the residual magnetism created in the rail by the magnet, said apparatus being characterized by the absence of a wheel between said magnet and detector unit, and by the substantial elimination of reverse magnetic flux in the rail rearwardly of the forward pole.

11. Apparatus for progressively detecting fissures in a rail comprising a plurality of steel frame members, spaced wheels supporting said frame members for movement along the rail in one direction, a nonmagnetic metal member separating each of said frame members, a magnet for inducing residual magnetism in the rail secured to one of the frame members, and a detector unit secured to another frame member and spaced rearwardly from said magnet substantially outside the field thereof for detecting variations in the residual magnetism created in the rail by the magnet, said apparatus being characterized by the absence of a wheel between said magnet and said detector.

12. In apparatus for magnetizing a rail for testing by the residual magnetic method, the combination of magnetizing means for setting up characteristic residual magnetic conditions in the vicinity of fissures in the rail, and a unidirectional cleaner magnet for suppressing residual fields set up by the magnetizing means due to surface defects, said cleaner magnet comprising a core whose axis makes a substantial angle to the rail, and having first and second poles spaced unequal distances from the rail.

WALTER C. BARNES.
HENRY W. KEEVIL.

REFERENCES CITED

The following references are of record in the file of this patent:

UNITED STATES PATENTS

| Number    | Name         | Date          |
|-----------|--------------|---------------|
| 1,867,685 | Sperry       | July 19, 1932 |
| 2,067,804 | Thorne       | Jan. 12, 1937 |
| 2,089,967 | Keevil       | Aug. 17, 1937 |
| 2,218,784 | Billstein    | Oct. 22, 1940 |
| 2,311,715 | Thorne       | Feb. 23, 1943 |
| 2,317,720 | Barnes et al.| Apr. 27, 1943 |
| 2,356,967 | Barnes et al.| Aug. 29, 1944 |